United States Patent
Mehrvar et al.

(10) Patent No.: US 9,462,359 B2
(45) Date of Patent: Oct. 4, 2016

(54) SYSTEM AND METHOD FOR PHOTONIC SWITCHING

(71) Applicant: Huawei Technologies Co., Ltd., Shenzhen (CN)

(72) Inventors: Hamid Mehrvar, Ottawa (CA); Eric Bernier, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 14/516,211

(22) Filed: Oct. 16, 2014

(65) Prior Publication Data

US 2015/0312659 A1    Oct. 29, 2015

Related U.S. Application Data

(60) Provisional application No. 61/984,504, filed on Apr. 25, 2014.

(51) Int. Cl.
*H04Q 11/00* (2006.01)

(52) U.S. Cl.
CPC ...... *H04Q 11/0062* (2013.01); *H04Q 11/0005* (2013.01); *H04Q 11/0066* (2013.01); *H04Q 2011/0073* (2013.01); *H04Q 2011/0092* (2013.01)

(58) Field of Classification Search
CPC ............... H04Q 11/0005; H04Q 2011/0073; H04Q 2011/0092
See application file for complete search history.

(56) References Cited

U.S. PATENT DOCUMENTS

| | | | |
|---|---|---|---|
| 6,665,495 B1 * | 12/2003 | Miles | ............... H04L 45/00 370/351 |
| 6,983,109 B1 | 1/2006 | Britz et al. | |
| 2001/0017866 A1 * | 8/2001 | Takada | ............... H04Q 11/0003 370/535 |
| 2004/0208539 A1 * | 10/2004 | Kopelovitz | ........ G02B 6/12009 398/45 |
| 2007/0086780 A1 * | 4/2007 | Islam | ................ G02B 26/0808 398/45 |
| 2007/0242604 A1 | 10/2007 | Takase et al. | |
| 2009/0052317 A1 | 2/2009 | Takagi et al. | |
| 2010/0111526 A1 | 5/2010 | Bader | |
| 2014/0334818 A1 | 11/2014 | Mehrvar | |
| 2014/0334821 A1 | 11/2014 | Mehrvar | |

FOREIGN PATENT DOCUMENTS

| | | |
|---|---|---|
| CN | 101056184 A | 10/2007 |
| CN | 101189838 A | 5/2008 |

OTHER PUBLICATIONS

Deng, N. et al., "An Optical Multi-ring Burst Network for a Data Center," Optical Fiber Communication Conference and Exposition and the National Fiber Optic Engineers Conference (OFC/NFOEC), Mar. 2013, 3 pgs.

(Continued)

*Primary Examiner* — Nathan Curs
(74) *Attorney, Agent, or Firm* — Slater Matsil, LLP

(57) ABSTRACT

In one embodiment, optical node includes an input port configured to receive an input optical frame and a first optical switch coupled to the input port, where the first optical switch is configured to remove the input optical frame to produce a removed input optical frame when an address of the input optical frame is a node address of the optical node and to pass the input optical frame to a second optical switch when an address of the input optical frame differs from the address of the optical node. The optical node also includes the second optical switch coupled to the first optical switch, where the second optical switch is configured to output the input optical frame to an output port when the address of the input optical frame is not the node address of the optical node and the address of the input optical frame is not an empty address.

19 Claims, 14 Drawing Sheets

(56) References Cited

OTHER PUBLICATIONS

Freund, R. et al., "1.28 Tb/s Single Wavelength Star-16-QAM Transmission over up to 800 m of Graded-Index Multimode Fibre," Institute of Electrical and Electronics Engineers, 14th OptoElectronics and Communications Conference, OECC 2009 Proceedings, Jul. 2009, 2 pgs.

International Search Report of Patent Cooperation Treaty (PCT), International Application No. PCT/CN2015/077307, Applicant Huawei Technologies Co., Ltd., date of mailing Jun. 19, 2015, 12 pages.

* cited by examiner

US 9,462,359 B2

SYSTEM AND METHOD FOR PHOTONIC SWITCHING

CROSS-REFERENCE TO RELATED APPLICATIONS

This application claims the benefit of U.S. Provisional Application Ser. No. 61/984,504 filed on Apr. 25, 2014, and entitled "Pure Photonic Ring Architecture and Method for Distributed Optical Packet Switching," which application is hereby incorporated herein by reference.

TECHNICAL FIELD

The present invention relates to a system and method for optical communications, and, in particular, to a system and method for photonic switching.

BACKGROUND

Growth of Internet traffic, fueled by the growth in the number of users and by increasing numbers of applications, results in a higher demand for bandwidth. This growth entails larger packet networks with greater switching capabilities. Data centers contain huge numbers of racks of servers, racks of storage devices, and other racks, all of which are interconnected via a massive centralized packet switching resource. In data centers, electronic packet switches are used to route data packets. Electronic packet switching at very high rates involves massive cooling and space costs. Packets may be transmitted optically. Thus, photonic packet switching is desirable.

The racks of servers, storage, and input-output functions contain switches which combine packet streams from their associated servers and/or other peripherals into a smaller number of high speed streams per switch which are routed to the packet switching core. Due to the common location of these switches as the highest component in the switch, such a switch is often referred to as Top Of Rack (TOR) switch, or simply a TOR. It should be noted that TORs need not always be installed at the top of a rack. Also, TORs receive the returning switched streams from that resource and distribute them to servers within their rack. There may be 4×40 Gb/s streams from each TOR to the packet switching core, and the same number of return streams. There may be one TOR per rack, with hundreds to tens of thousands of racks, and hence hundreds to tens of thousands of TORs in a data center.

SUMMARY

An embodiment optical node includes an input port configured to receive an input optical frame and a first optical switch coupled to the input port, where the first optical switch is configured to remove the input optical frame to produce a removed input optical frame when an address of the input optical frame is a node address of the optical node and to pass the input optical frame to a second optical switch when an address of the input optical frame differs from the address of the optical node. The optical node also includes the second optical switch coupled to the first optical switch, where the second optical switch is configured to output the input optical frame to an output port when the address of the input optical frame is not the node address of the optical node and the address of the input optical frame is not an empty address.

An embodiment method of managing traffic in an optical ring includes receiving an input optical frame and an address of the input optical frame and removing the input optical frame from the optical ring when the address of the input optical frame is a node address of a current node of the optical ring. The method also includes transmitting an output optical frame on the optical ring when the address of the input optical frame is either the node address of the current node or an empty address.

An embodiment optical system includes a plurality of optical nodes and a first plurality of optical fibers connected the plurality of nodes in a first optical ring. A first node of the plurality of nodes includes a first optical switch configured to transmit a first plurality of optical frames on the first optical ring and a second optical switch configured to remove a second frame from the first optical ring.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
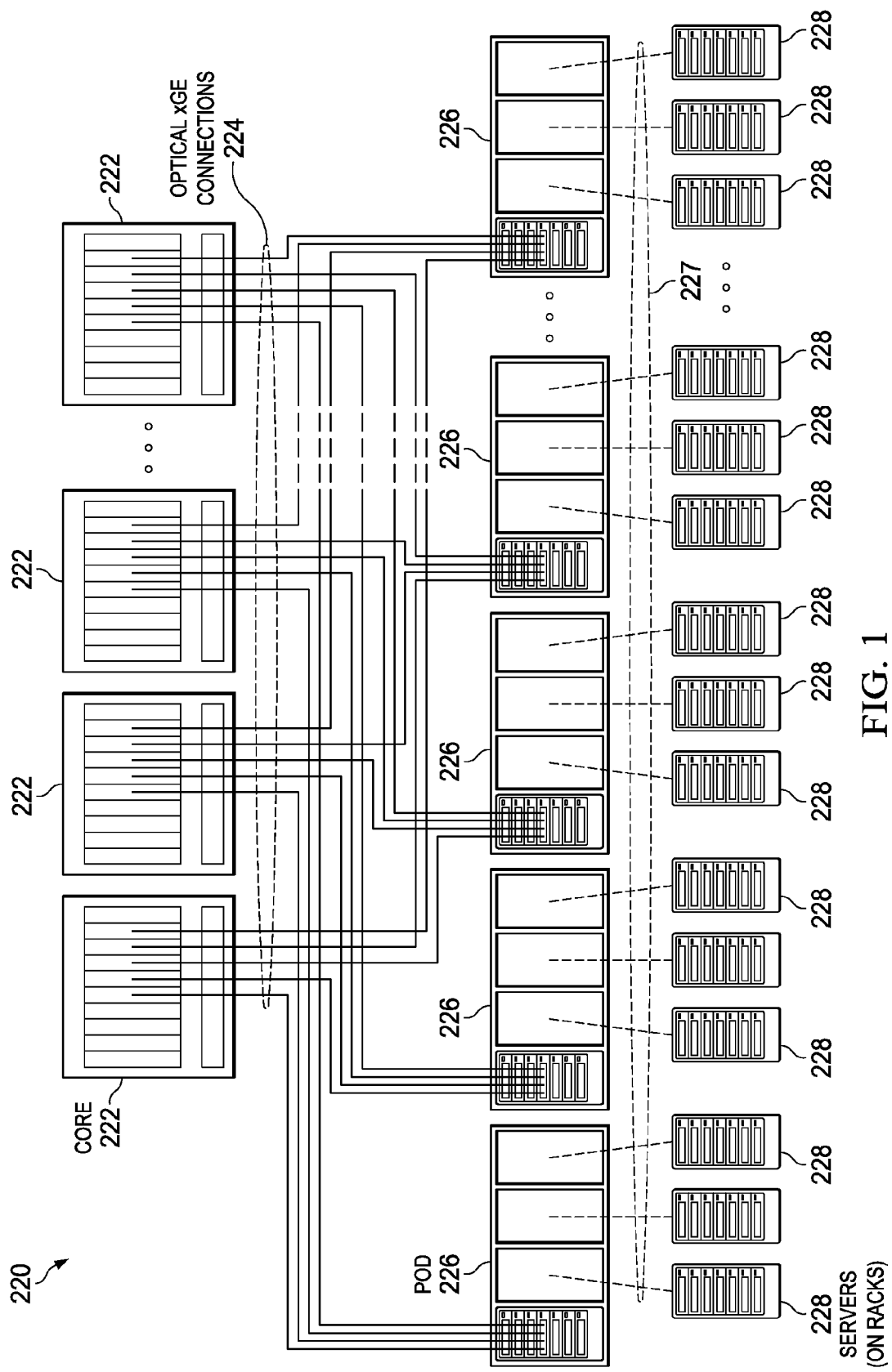
FIG. 1 illustrates an embodiment data center.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment photonic switch is a bufferless space switch which operates asynchronously with a distributed architecture using parallel interfaces. For example, an all-optical ring architecture is used. N parallel interfaces form N optical rings, where the nodes have N 1×2 photonic switches and N 2×1 photonic switches. A pair of 1×2 and 2×1 optical switches provides a pass-through, add, and drop capability for photonic frames in the optical ring. In one embodiment, a distributed architecture is combined with a centralized architecture to produce a large switch with centralized switching in nodes of an optical ring. Both photonic data and photonic control signals propagate around the ring. In one example, a wrapper scheme is used, where a gap between frames facilitates photonic switching, and a photonic header provides routing information. In another example, data path frames are native Ethernet packets with compression techniques to increase the inter-packet gap for photonic switching. Control signals, including both routing signals and other control signals, are sent during the gap time. Buffering may occur in the electrical domain prior to the optical ring.

In an embodiment, a bufferless centralized space switch, for example an N×N photonic switch, for example 32×32, is used, for example in a node of an optical ring in synchronous mode. In one embodiment, one wavelength is used to signal the grant or rejection of a frame, which may be wrapped in a frame, or not wrapped, to an output destination. The transmission between top-of-rack (TOR) switches and a photonic switching fabric is synchronized for the slot duration. Following contention analysis, a switch controller determines a switching map for the time slot. Frames are then synchronously received at the input of the photonic switch from TOR switches with different round trip times (RTTs). The scheduling algorithm is based on a slot based system, in which a switch sends a periodic transmission of a synchronization message over one signaling wavelength per slot, or once every few slots. Since the photonic frames arrive at the switch inputs at the same time with some minimal jitter, a time slot is used as a unit of time. Additional details on an embodiment centralized photonic switch are provided by U.S. patent application Ser. No. 14/246,711 filed on Apr. 7, 2014, and entitled "System and Method for Photonic Switching," which application is hereby incorporated herein by reference.

FIG. 1 illustrates data center 220, a two-tiered data center network. The lower tier contains TOR or end of row switches in pods 226, while the upper tier contains core switches 222. Servers 228 are connected to pods 226 via Gigabit Ethernet (GE) or 10 GE links 227. Also, pods 226 are connected to core switches 222 via links 224, which may be 10 GE links, 40 GE links, 100 GE links, or another link type.

Figure 2:
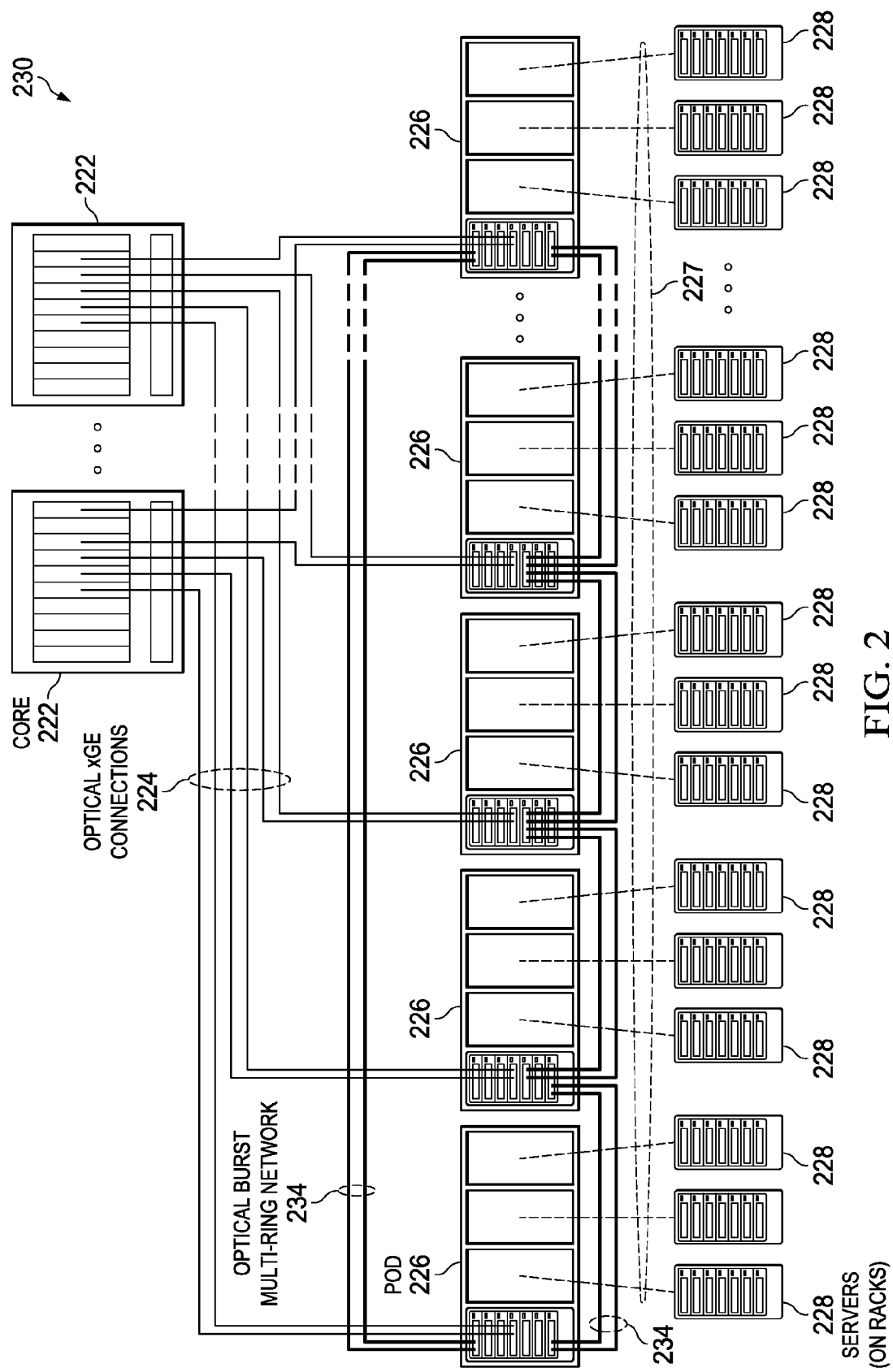
FIG. 2 illustrates an embodiment optical burst multi-ring network.

FIG. 2 illustrates data center 230, an optical burst multi-ring network with an electronic ring using multiplexing and demultiplexing. As in data center 220, core switches 222 are connected to pods 226 by links 224, and pods 226 are connected to servers 228 by links 227. Pods 226 are also connected to each other directly via optical multi-ring burst network 234. High volume inter-pod traffic may be offloaded and switched to the destination pods in a distributed way using the optical burst multi-ring network.

Figure 3:
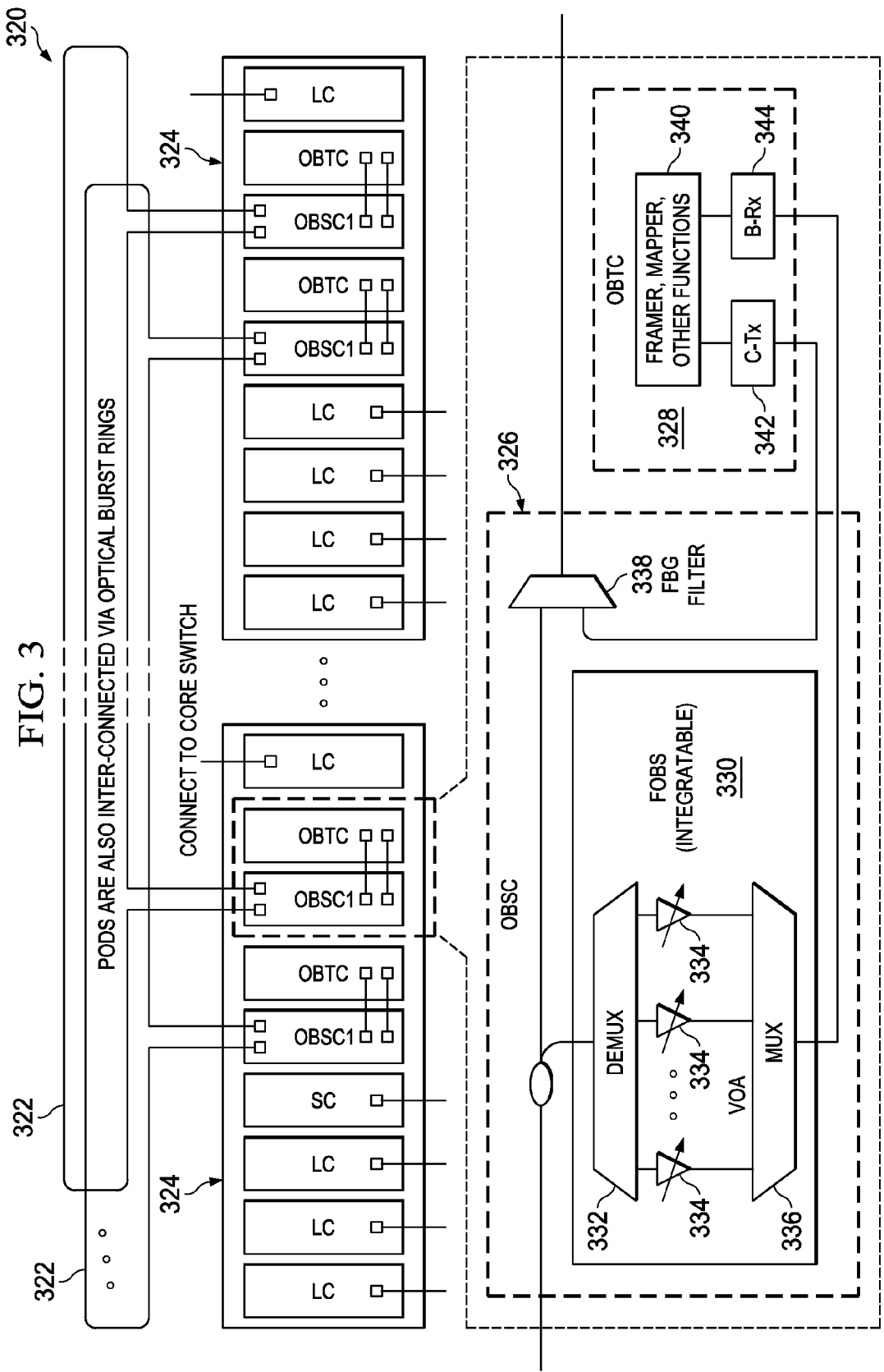
FIG. 3 illustrates an embodiment pod system.

In another embodiment, FIG. 3 illustrates system 320, an architecture with pod switches having pluggable modules or cards. Pods 324 contain a few line cards (LCs) configured for accessing traffic from servers, some LCs for connecting core switches, and one or more switch cards (SCs) for switching and aggregating traffic. Also, at least one optical burst switch card and at least one optical burst transceiver card (OBTC) are inserted to interconnect other pods via the optical burst multi-ring network. LCs monitor and sense the GE traffic from the servers and decides to forward the traffic either to other LCs destined for core switches or to an OBTC destined for the burst ring network. Optical burst rings 322 connect pods 324. This example uses wavelength multiplexers and demultiplexers. It also works with single wavelength transmission. The scalability is proportional to the number of wavelengths on a fiber.

Figure 4:
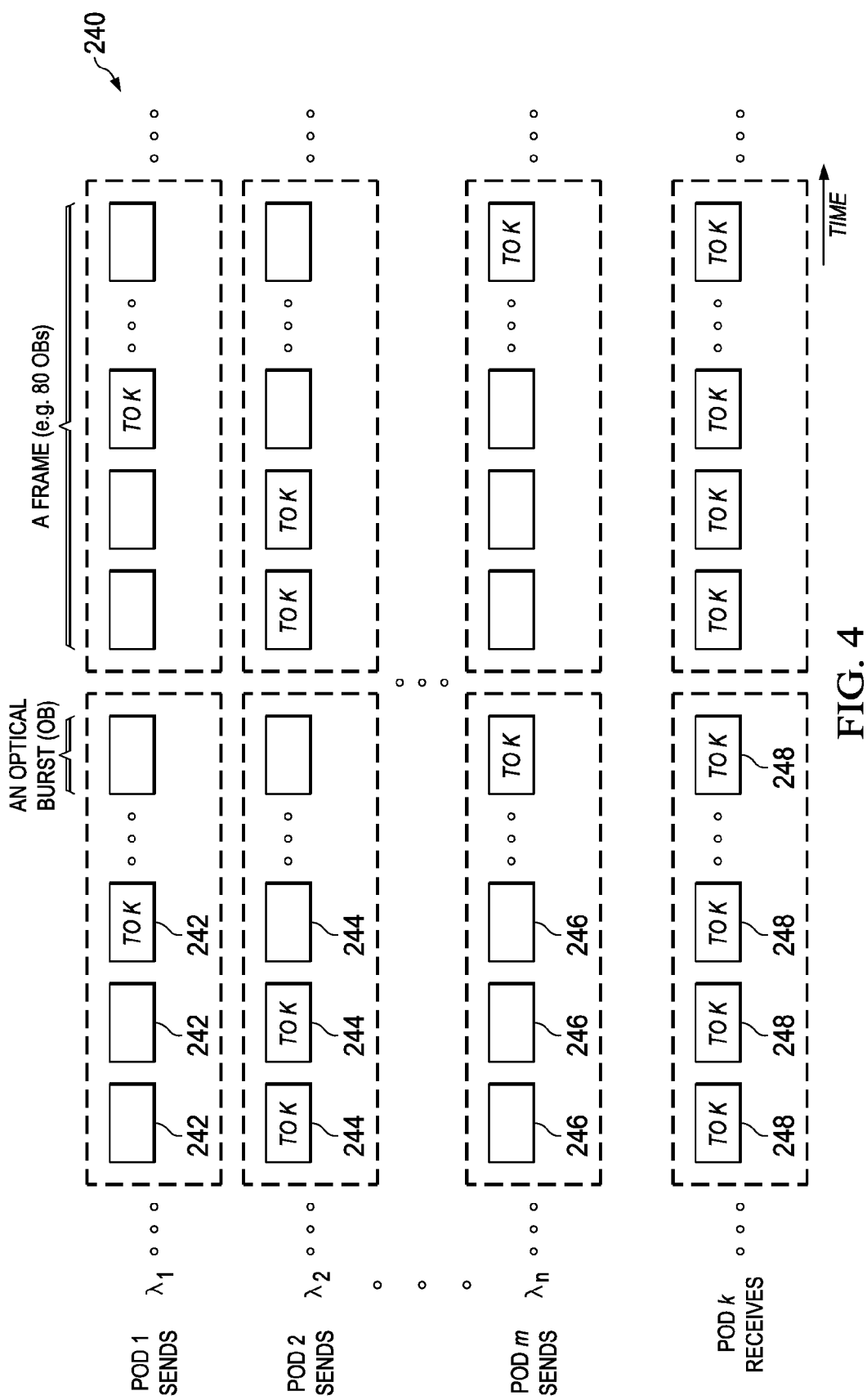
FIG. 4 illustrates optical bursts between pods.

In an example optical burst network, fixed wavelength transmitters emit an optical burst signal at a certain wavelength carrying optical bursts to different pods, where different wavelengths are destined for different pods. The optical burst signal is then added onto the ring via fiber Bragg grating (FBG) filter 338 in OBSC 326. The composite wavelength division multiplexing (WDM) burst signal on the rings has a frame structure, with a frame containing a number of optical bursts (OBs), for example 80 OBs. FIG. 4 illustrates an example burst structure, burst structure 240 with OBs 242 from pod 1, OBs 244 from pod 2, OBs 246 from Pod m, and OBs 248 received by pod k. At the receiver side, the WDM optical burst signals destined for the present pod are removed from the ring through silicon integratable fast optical burst selector (FOBS) 330, which contains demultiplexer 332, fast variable optical attenuator (VOA) array 334, and multiplexer 336. OBTC 328 contains framing module 340, transmitter 342, and receiver 344. The number of pods may be equal to the number of wavelengths. For example, there may be 80 pods for a 50 GHz WDM grid with 80 wavelengths.

Figure 5A:
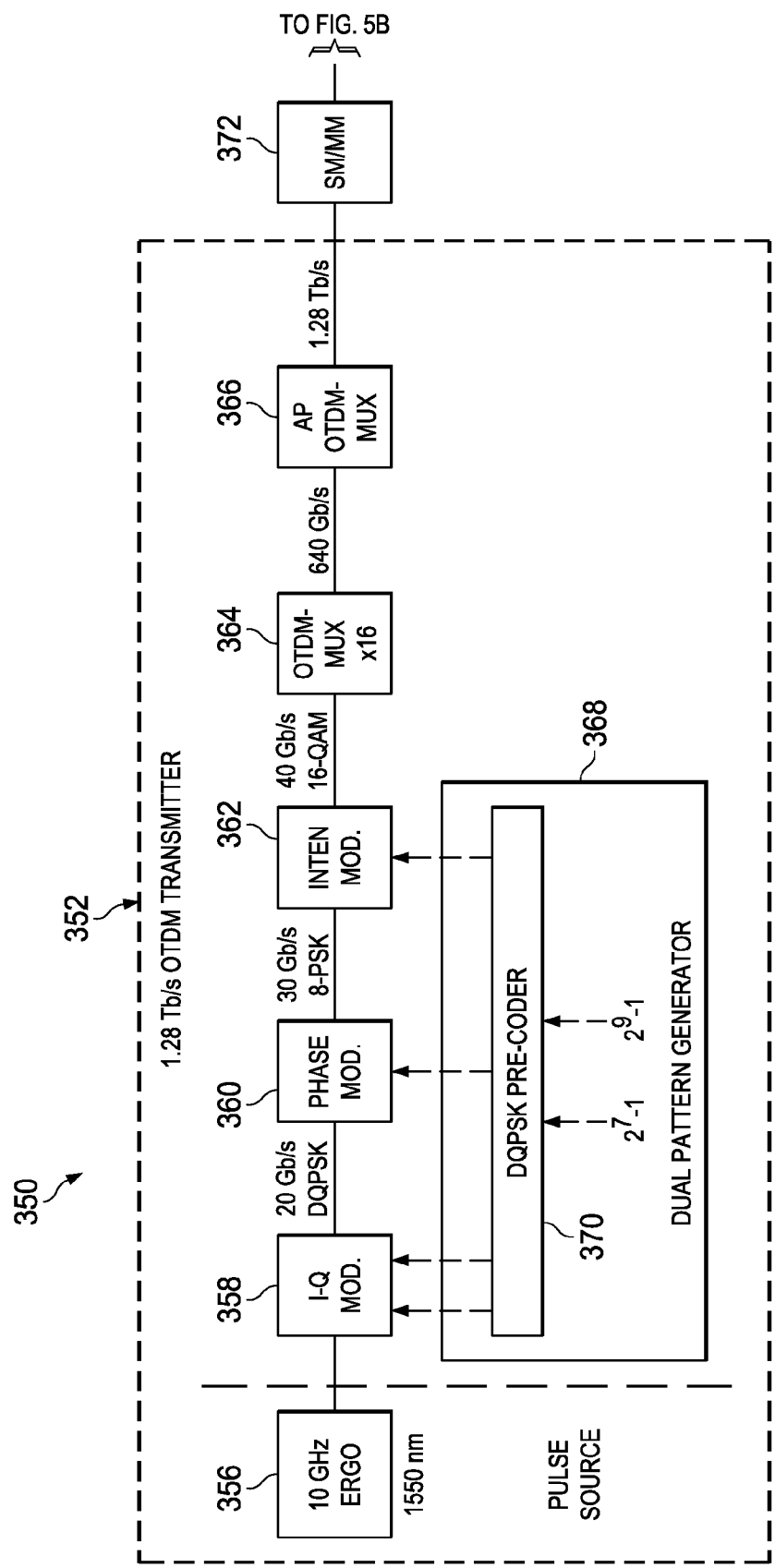
FIGS. 5A-5B illustrates an embodiment optical time division multiplexing (OTDM) transceiver.
Figure 5B:
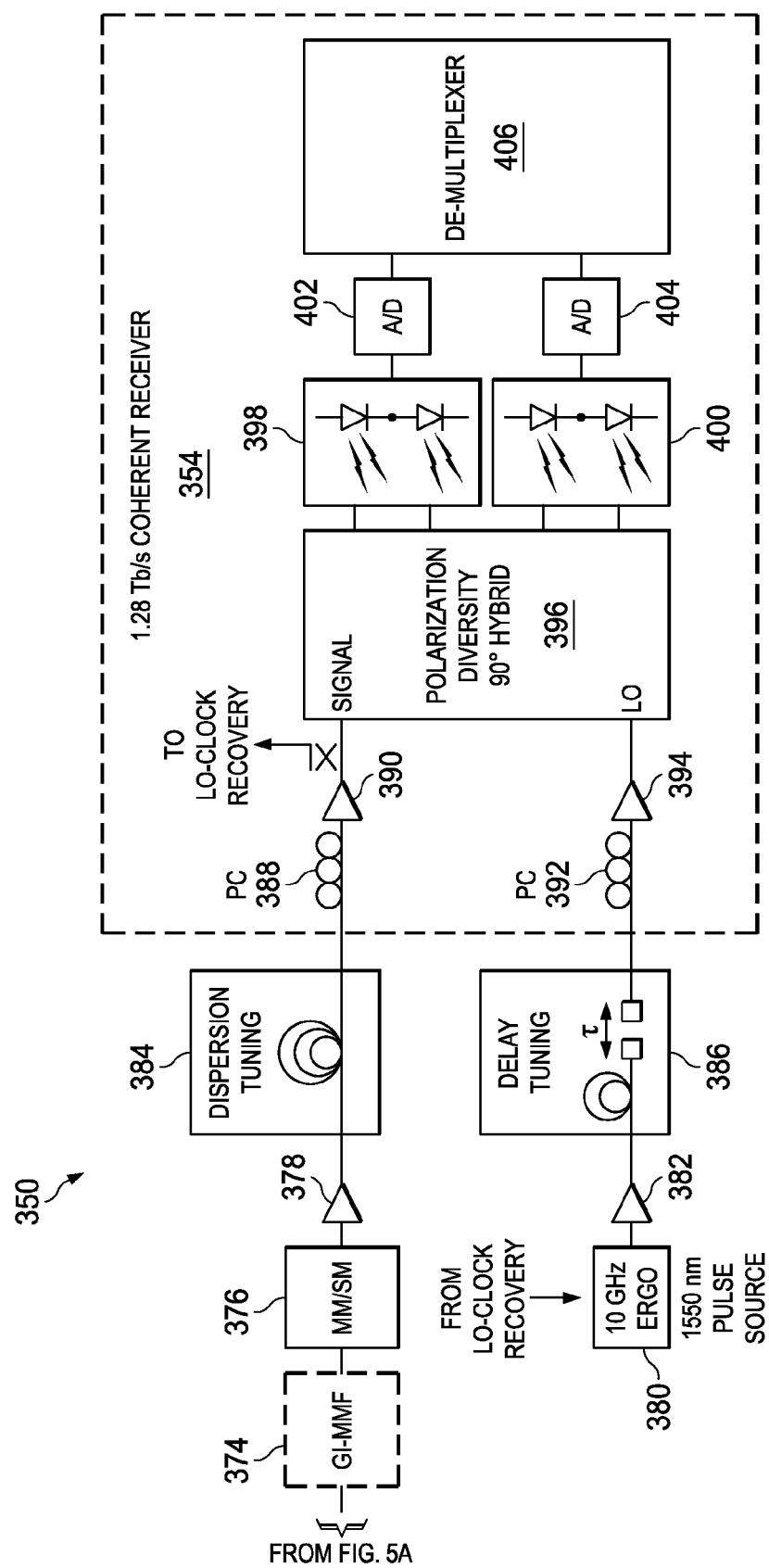

FIGS. 5A-5B illustrate transceiver 350, a 1.28 Tbps transceiver, which may be used in an optical ring structure. Graded index multi-mode fiber (GI-MMF) 374 couples transmitter 352 and receiver 354. A fiber having a relatively large core diameter, for example 50 μm, may be used for high coupling tolerances and low losses.

Transmitter 352 contains laser 356, for example a 10 GHz mode-locked solid state 1550 nm ERGO laser which generates Gaussian shaped pulses with a full width half maximum (FWHM) of 2.1 ps. The pulses are modulated to 20 Gb/s by in quadrature (IQ) modulator 358. Then, the pulses are modulated by 8-phase shift keying (PSK) by phase modulator 360 and 16-quadrature amplitude modulation (QAM) by intensity modulator 362. The modulators are driven by signals generated by pattern generator 368 by differentially encoded quadrature phase-shift keying (DQPSK) pre-coder 370. The driving signals are derived from de-correlated $2^7-1$ and $2^9-1$ pseudo random bit sequences. To generate high bit rates at a single wavelength, the 30 Gb/s 8-PSK or 40 Gb/s 16-QAM signals are multiplexed by decorrelated optical fiber delay multiplexer stage with a variable multiplexing factor by optical time division multiplexing (OTDM) 16-way multiplexer 364 and alternating polarization (AP) OTDM multiplexer (MUX) 366.

The signals propagate along single mode (SM) or multi-mode (MM) fiber 372 and along GI-MMF 374 and fiber 376, another single mode or multi-mode fiber. The signal passes through amplifier 378. Dispersion tuning is performed by dispersion tuner 384 to reduce the pulse width of the received signal before optical demultiplexing. A pulse source is generated by pulse source 380 from clock recovery. The pulse source, for example from a second free running ERGO laser is adjusted in time to overlap with one of the tributaries of the OTDM signal The generated clock is amplified by amplifier 382 and delayed by delay tuner 386.

Then, receiver 354 receives a signal over optical fibers 388 and 392. This signal is then amplified by amplifiers 390 and 394. The signals are sent to block 396, a polarization diversity 90 degree hybrid. The signals are converted from the optical domain to the electrical domain by optical-to-electrical (OLE) converters 398 and 400, and from analog to digital by analog-to-digital (A/D) converters 402 and 404. De-multiplexing and signal processing are performed by block 406, which includes sampling the acquired IQ data to an integer number of 5 samples per symbol, clock recovery to find and select samples from the center of the slot, frequency offset correction, phase estimation and correction based on the m-th power block scheme, and error counting.

Figure 6:
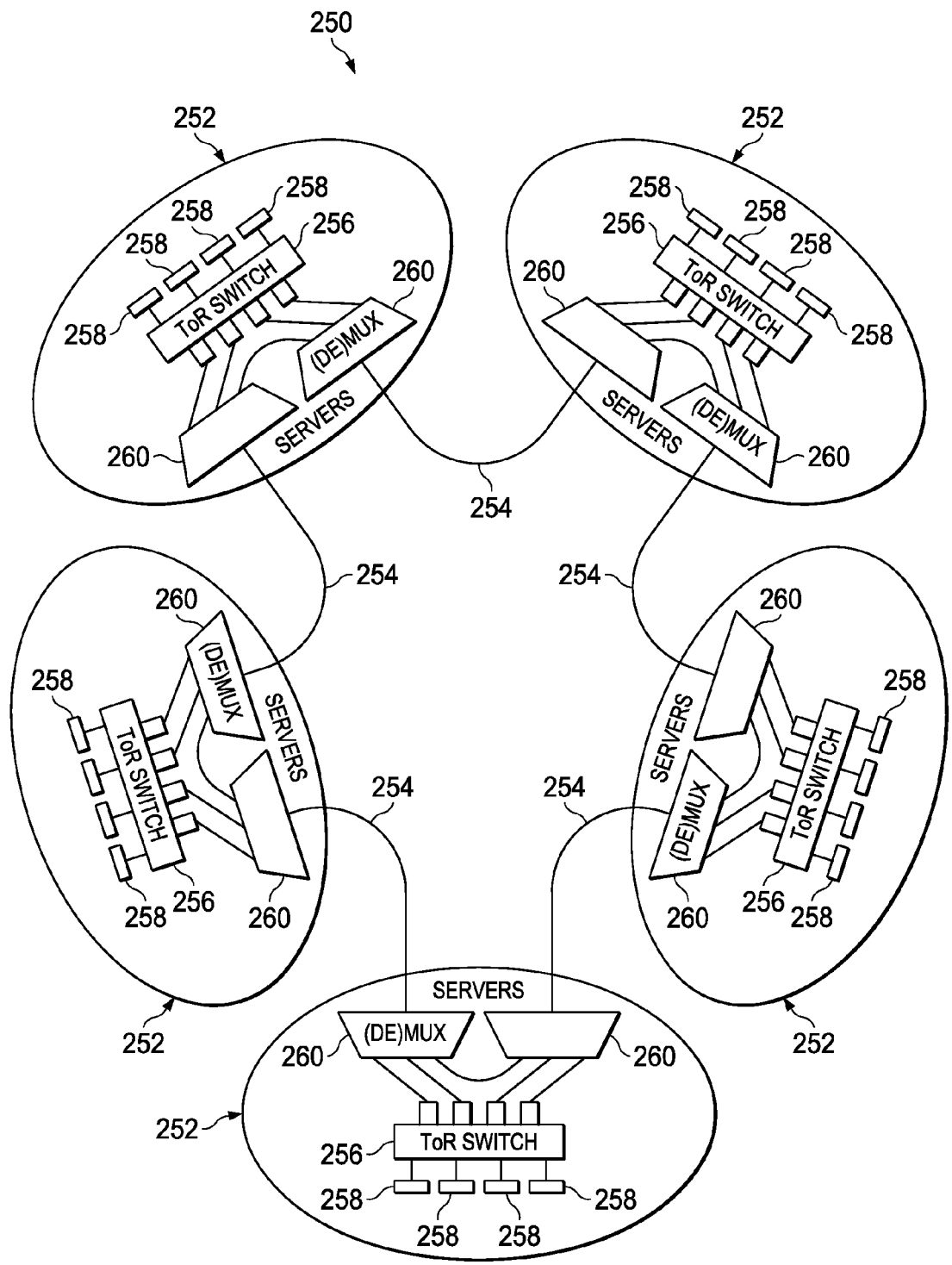
FIG. 6 illustrates an embodiment photonic optical ring interconnect using optical multiplexing and de-multiplexing.
Figure 7:
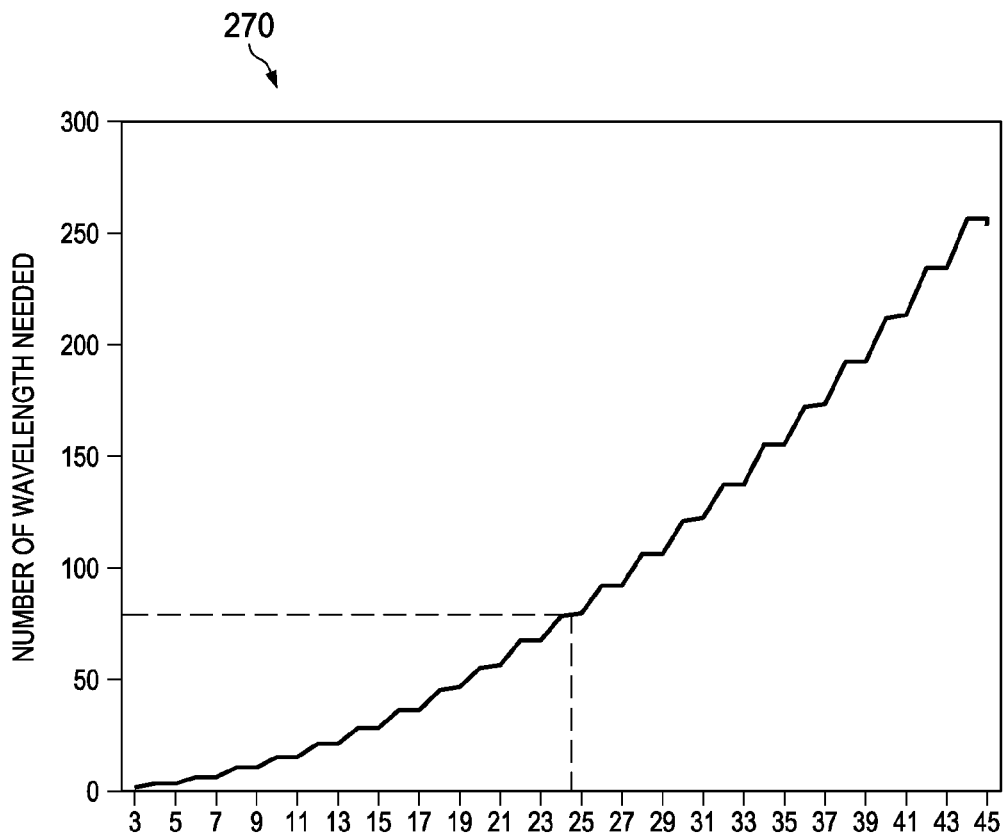
FIG. 7 illustrates a graph of the number of ring nodes versus the number of wavelengths.

FIG. 6 illustrates ring 250 which uses WDM with separate wavelengths which provide for connectivity between nodes 252 over links 254 in N/2 hops, where N is the number of nodes. A node contains TOR switch 256 and multiplexers and demultiplexers 260. The TOR switches are connected to servers 258. FIG. 7 illustrates graph 270 of the number of wavelengths versus the number of ring nodes. For 24 nodes there are 80 wavelengths. The optical signal is converted to an electrical signal in the nodes, and then back to an optical signal for transmission around the loop.

An embodiment photonic switching fabric includes a bufferless space switch without the use of WDM or arrayed waveguide gratings (AWG-Rs). In such an embodiment, a distributed architecture using parallel interfaces is used. In one embodiment, a distributed solution may be used in concert with a centralized solution. An embodiment distributed photonic switch or ring uses 1×2 and 2×1 space switches for adding packets to a photonic ring and dropping packets from the photonic ring. Multiplexing and demultiplexing for ring access are not used, where buffering is performed in the electronic domain prior to ring access. The photonic data signals and photonic control signals share the same ring. Embodiments may be synchronous or asynchronous.

Figure 8:
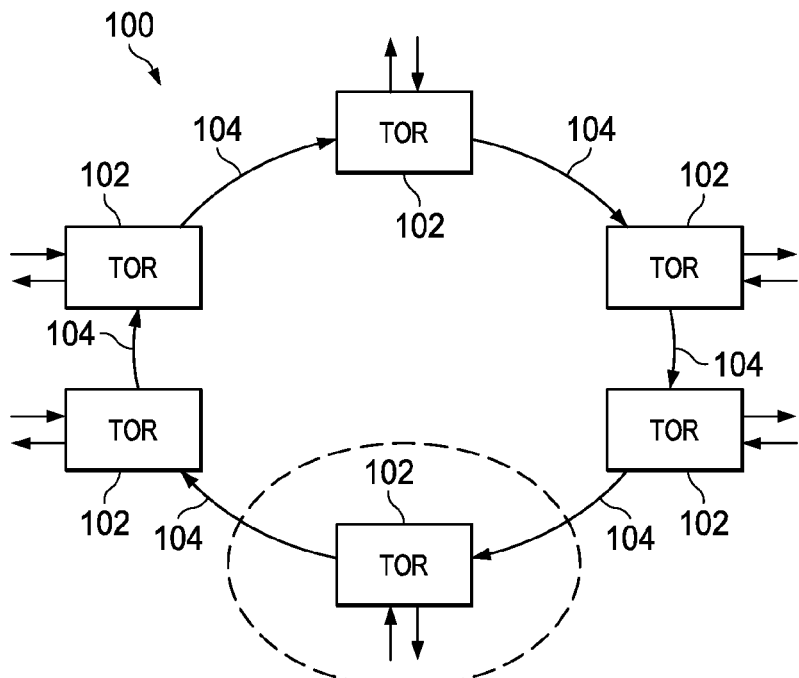
FIG. 8 illustrates an embodiment photonic ring.

FIG. 8 illustrates optical ring 100, which contains nodes 102 configured with optical links 104 connecting the nodes in an optical ring. 1×2 and 2×1 optical switches add and drop packets from the TOR switches to the ring.

An embodiment includes numerous 1×2 and 2×1 photonic switches. The switches may be 1×2 and 2×1 switches, 2×2 switches, 4×4 switches, or another switch size. They may be fabricated in silicon photonics (SiP) in a photonic integrated circuit (PIC) for many parallel rings integrated in TOR switches. For example, there may be 20 to 100 rings in a configuration with 20 nodes per ring.

A frame structure may be used in a photonic ring. In one embodiment, a wrapper scheme is used to produce a gap between frames, which may be used for processing time. An embodiment wrapper scheme removes the inter-packet gap (IPG) between individual packets by concatenating packets to form wrapped photonic frames and inserts an appropriate gap time between the wrapped photonic frames. This gap time may be used to set up a photonic switch for switching the photonic frames. In one example, packets belonging to a group address with a particular label based on an addressing scheme are wrapped together. Alternatively, packets can be grouped in another way. For example, packets which arrive consecutively from the same TOR or TOR groups are grouped together. In one example, a gap time of 201 ns is used, and 20 packets are in a wrapped packet at a data rate of 10 Gbps. In this example, the control time is 101 ns, the switching time is 40 ns, and the clock and data recovery (CDR) time is 60 ns. For a link rate of 100 Gb/s with 32 packets wrapped in a photonic frame, with an IPG of 12 bytes, the sum of the IPGs is 384 bytes, which is equal to the gap time, about 30 ns. The inserted gap has a low overhead, because the IPGs are removed. Additional details on one embodiment of the packet wrapper are provided by U.S. patent application Ser. No. 14/275,520 filed on May 12, 2014, and entitled "System and Method for Photonic Switching," which application is hereby incorporated herein by reference.

In another embodiment, native Ethernet packets are used with a compression technique to increase the inter-packet gap for photonic switching.

In an example, control signals are sent during the gap time. The control signals may include both the destination node address for routing and fairness control signals. The routing information propagates along the ring in the same direction as the traffic, clockwise or counter-clockwise, while fairness control information propagates in the reverse direction to traffic. In one embodiment, the control and data paths use separate wavebands. Some wavebands that may be used include the 800 nm waveband, the 1310 nm waveband, and/or the 1550 nm waveband. In one example, the control signal is wavelength encoded, where the presence or absence of light in a wavelength indicates an address bit. The signaling waveband is used for routing requests, synchronizations, grants, and other control signals used in the operation of a photonic switch. Additional details on one method of using separate wavebands for control and data are provided by U.S. patent application Ser. No. 14/246,633 filed on Apr. 7, 2014, and entitled "System and Method for Photonic Switching," which application is hereby incorporated herein by reference.

Figure 9:
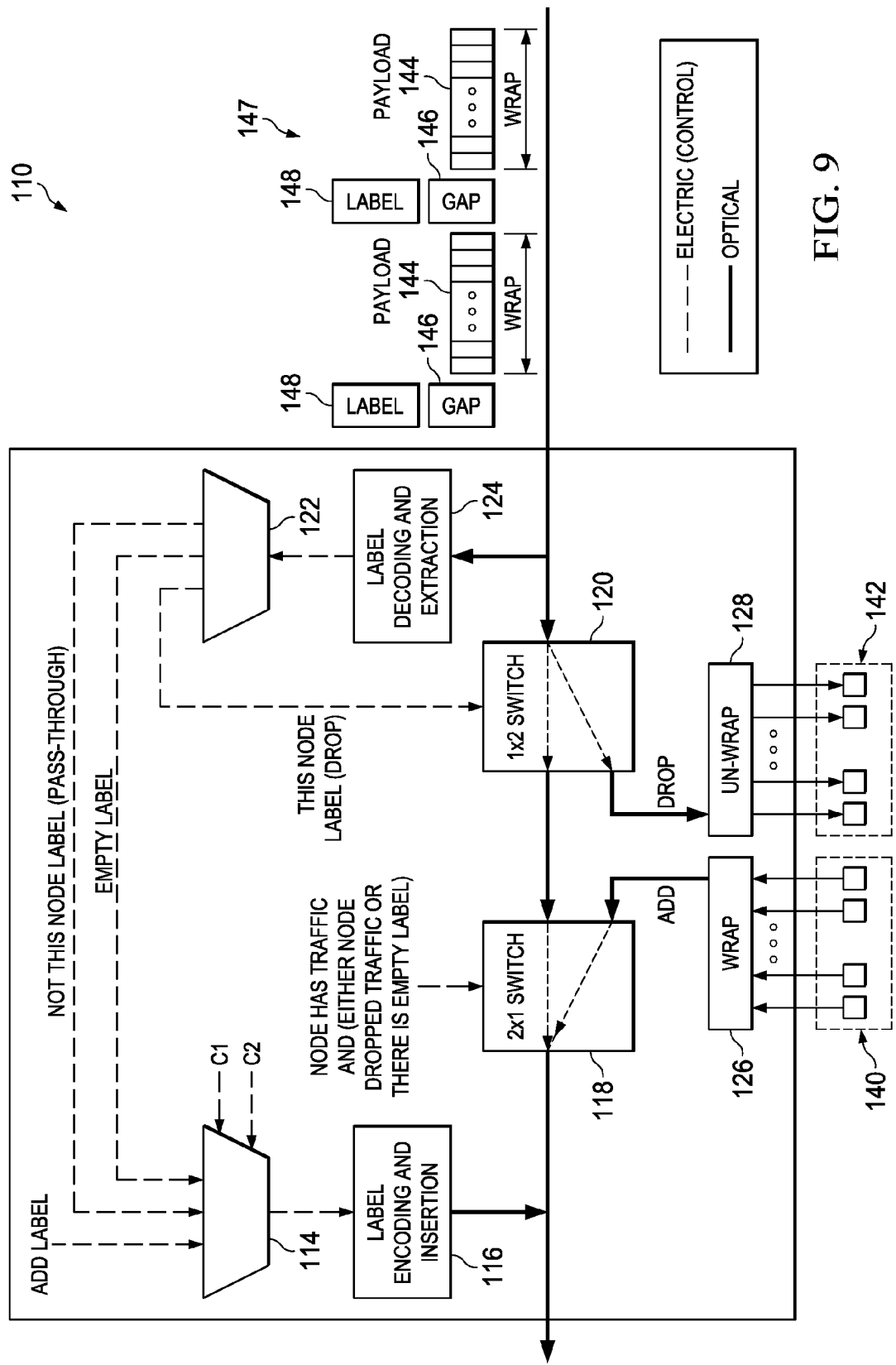
FIG. 9 illustrates an embodiment node of a photonic ring.

FIG. 9 illustrates node 110, a node in an optical ring, for example optical ring 100. In one example, ring traffic has priority over new traffic. Frames 147 are received by node 110. The frames may be 100 GE, 200 GE, 400 GE or at a higher rate, for example 1.28 Tbps. Frames 147 may be wrapped photonic frames, which contain data regions and header regions concatenated together in frame 144. Gap 146 is disposed between wrapped photonic frames. Label 148 identifies the wrap and is sent over an out-of-band label at a different wavelength than the traffic wavelength, arrives during gap 146. In one example, label 148 is a wavelength encoded address. The headers for the individual packets are similar to those in unwrapped packets. In this example, the time between wrappers is the gap time and is given by:

$$GAP=\Sigma_i IPG_i.$$

In another example, frame 147 contains data regions and header regions concatenated together using the same in-band wavelength. The label and gap are disposed between the wrapped frames. The label is sent in-band, and the time between wrapped packets is the sum of the time of the gap and the label, which is given by:

$$GAP+Label=\Sigma_i IPG_i.$$

The label is directed to label decoding block 124, which decodes and extracts the label. The label indicates the destination of the frame. In one example, where in-band signaling is used, a portion of the power is directed to label decoding block 124, for example by a 10% splitter. Alternatively, when a different waveband is used for the traffic and control signals, the control signals are separated by filtering the control waveband in decoding block 124. The label is extracted and decoded. To decode the label, when the label is wavelength encoded, the power on the wavelengths is detected to determine the bits for the address. Alternatively, the address is a series of pulses, which are detected. The decoded electrical address is sent to block 122.

Block 122 determines whether the label is an empty label, a label for the current node, or a label for another node. When the label is an empty label, a new frame is sent when there is a new frame in the node ready for transmission. When there is a pass through label for another node, a new frame is not added, and the label is re-inserted, while the frame continues along the ring. When the label is for the current node, the frame is dropped, and a new frame may be added when there is a new frame ready for transmission in the node. A two bit signal may be created after decoding the routing information. In one example, a node performs actions based on the status. The actions may be specified by two bit signals, C1 and C2, where C1 indicates whether the node has traffic to send, and C2 indicates whether pass-through traffic exists. Table 1 below illustrates the actions to be performed based on the two bit signal. A 1 for C2 indicates that the pass-through label is to be reinserted. This is for when the current frame continues around the ring. When C1 is 1 and C2 is 0 the add label is inserted. This occurs when the frame from the current node is added. A new frame may be inserted to replace a current frame being dropped or into an empty wrapper slot. When C1 and C2 are both 0, there is currently no frame in this timeslot and an empty label is inserted.

TABLE 1

| C1 | C2 | Action |
|----|----|--------|
| X  | 1  | Pass through label re-inserted |
| 1  | 0  | Add label inserted |
| 0  | 0  | Empty label inserted |

Block 122 propagates the decision to switch 120, 118 and block 114. Switch 120 is a 1×2 photonic switch for dropping frames. When the label is for the current node, the frame is dropped from the optical ring. The frame is directed to unwrapper 128, where the frame is unwrapped. For example, the packets in the frame are separated, and an IPG is inserted between the packets. Then, packets 142 are directed to their destinations. In another example, instead of an unwrapper, an OTDM demultiplexer is used to direct packets to their destinations.

Switch 118, a 2×1 switch, is used to add frames. Switch 118 is configured to add a frame when the current node has a frame for transmission and either the current wrapper is empty or the current frame on the ring is dropped. When there is a frame to be added, wrapper 126 wraps packets 140 to produce a wrapped frame. The wrapped frame is added to the ring via switch 118. Wrappers and un-wrappers may operate in synchronous and asynchronous schemes. In another example, instead of a wrapper, an OTDM multiplexer is used to add frames. The multiplexer and demultiplexer are synchronized with the switches for adding and dropping frames.

Block 114 determines which label is added. When the label is empty, or the arriving label indicates the current node, and this node has a frame for transmission, the destination of the added frame is inserted into the label, along with the added frame. However, when the label is empty or indicates the current node, and this node does not have a frame for transmission, an empty label is added. When the label is for another node, the same label is used, and the frame continues around the optical loop.

Then, label encoder 116 adds the label to the frame. The label is inserted into the ring. The label may be in a separate waveband than the traffic, and may wavelength encode the address.

Figure 10:
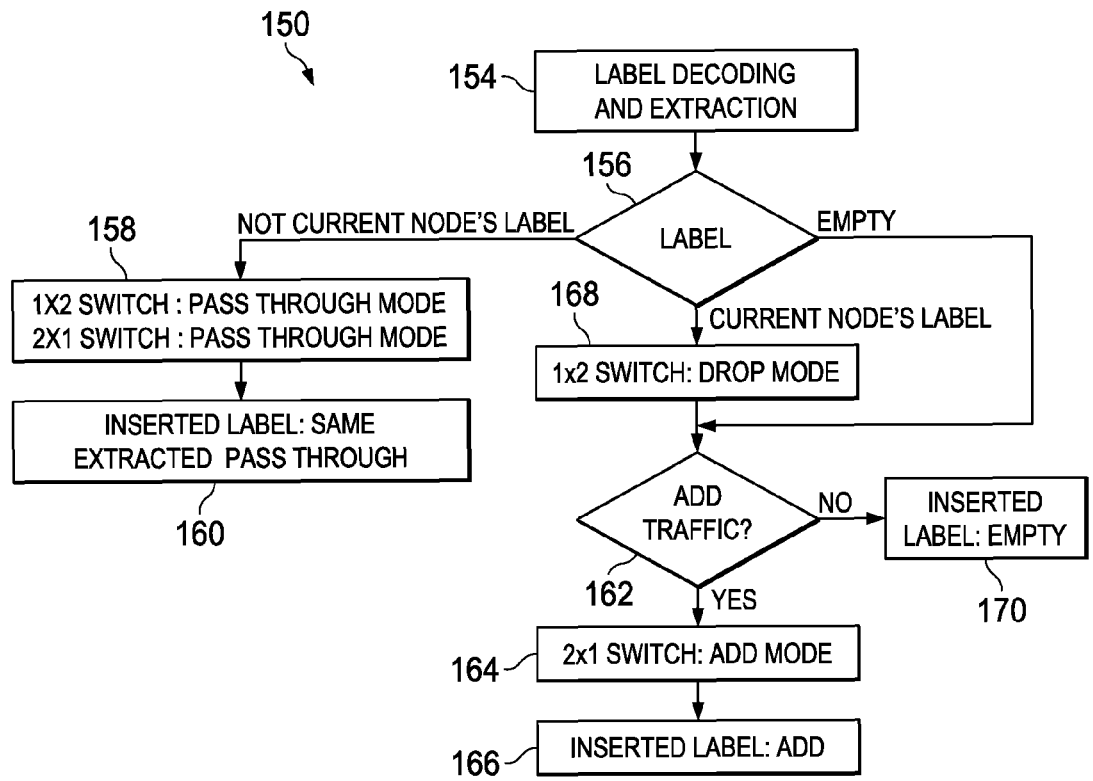
FIG. 10 illustrates a flowchart of an embodiment method of managing traffic in a photonic ring.

FIG. 10 illustrates flowchart 150 for a method of controlling traffic in an optical ring. During the gap time, the label is decoded and extracted in step 154. The label indicates the address of the destination of a packet. In one example, the label is wavelength encoded, with different wavelengths representing the bits of the address. In this example, the power on the wavelengths is detected, and converted to electrical signals. The label may be in a separate waveband than the traffic.

Then, in step 156, the classification of the address in the label is considered. It is determined whether the label is an empty label, a label for the current node, or a label for another node. When the label is empty, the system proceeds to step 162. When the label is for the current node, the system proceeds to step 168. When the label is for another node, the system proceeds to step 158.

In step 158, the switches are configured to pass the current frame through. For example, a 1×2 switch is configured to pass the frame through and a 2×1 switch is configured to pass the label around the optical loop along with the frame. The label may be removed and re-inserted.

Next, in step 160, the label is inserted. The extracted label is re-inserted along with the continuing frame. The label may be inserted in a gap between frames. Thus, the frame and its label continue along the ring.

In step 168, the 1×2 switch is configured to drop the frame, because the frame is destined for the current node. The packets of the frame are unwrapped and proceed to their destination. For example, an IPG is inserted between the packets.

In step 162, the system determines whether there is traffic to be added from the current node. The frame is empty, either because it arrived empty or the frame was dropped. When there is traffic to be added, the system proceeds to step 164. However, when there is no traffic to be added, the system proceeds to step 170.

In step 170, the empty label is inserted into the ring. The frame is also empty.

In step 164, the 2×1 switch is configured to add a frame. A new frame is added. Packets are wrapped into a frame with a gap, and the frame is inserted into the optical ring. Alternatively, for a synchronous slotted system, a wrapper fits into a slot time or OTDM is used.

Then, in step 166, the label is added. The label indicates the address of the added frame. The label may be added in the gap. In one example, the label is wavelength encoded in a separate waveband than the traffic signal.

Figure 11:
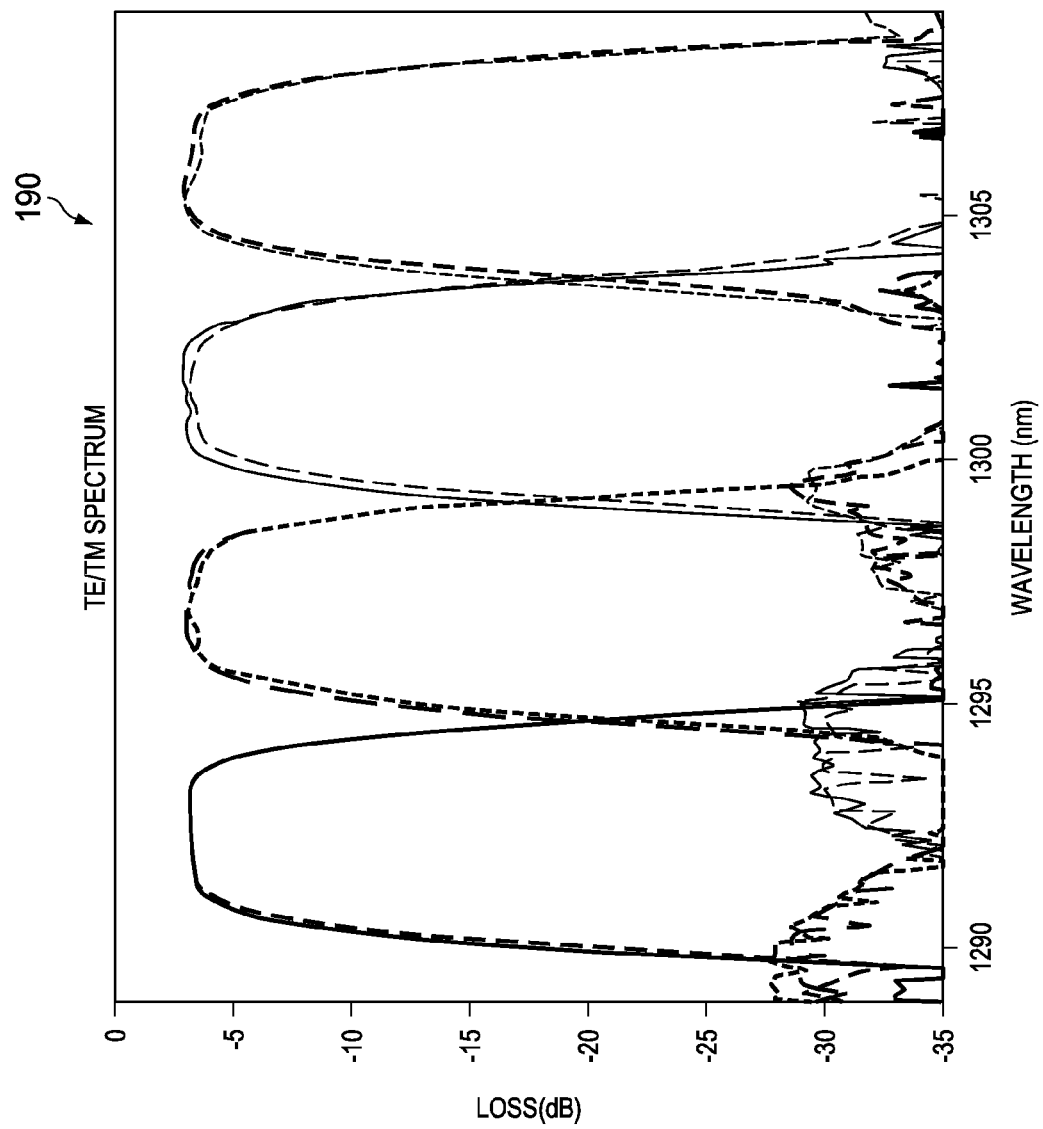
FIG. 11 illustrates an optical spectrum.

In one embodiment, the 1310 nm waveband is used for traffic propagation. For example, the traffic uses 4×10 G, 4×25 G, 4×50 G, 16×25 G, or 4×100 G. The traffic propagates around an optical ring. FIG. 11 illustrates wavelength spectrum 190, with 4 wavelengths in the 1310 nm waveband, which may be used for the traffic. This is the transverse electric (TE) transverse magnetic (TM) spectrum.

Figure 12:
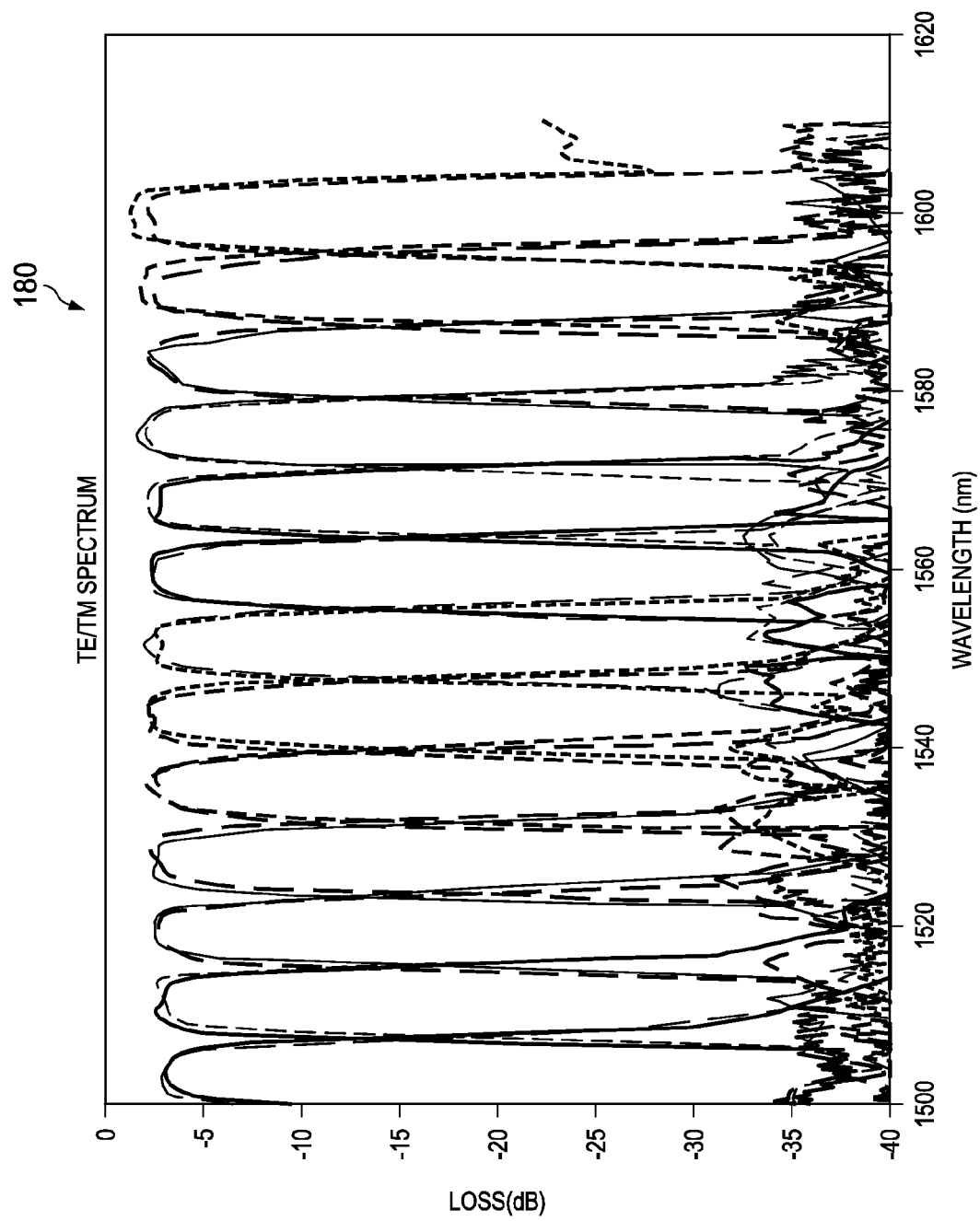
FIG. 12 illustrates another optical spectrum.

In one embodiment, the 1550 nm waveband is used for signaling and control. FIG. 12 illustrates spectrum 180 for the control spectrum with 12 wavelengths for signaling and control. In one example, 8 wavelengths are used to carry 8 bit addresses for routing. For example, the presence or absence of power on the 8 wavelengths indicates bits for the address. 8 bits are used for 256 addresses for 256 nodes on a ring. Two bits are used for the status of starvation set by upstream nodes for the reverse direction. For example, 00 indicates normal, 01 indicates yellow for a warning, 10 indicates orange for a stronger warning, and 11 indicates red for a problem. When red is indicated, there is too much traffic on the ring. The traffic in the ring may then be slowed down. Also, two bits are reserved for other controls.

Figure 13:
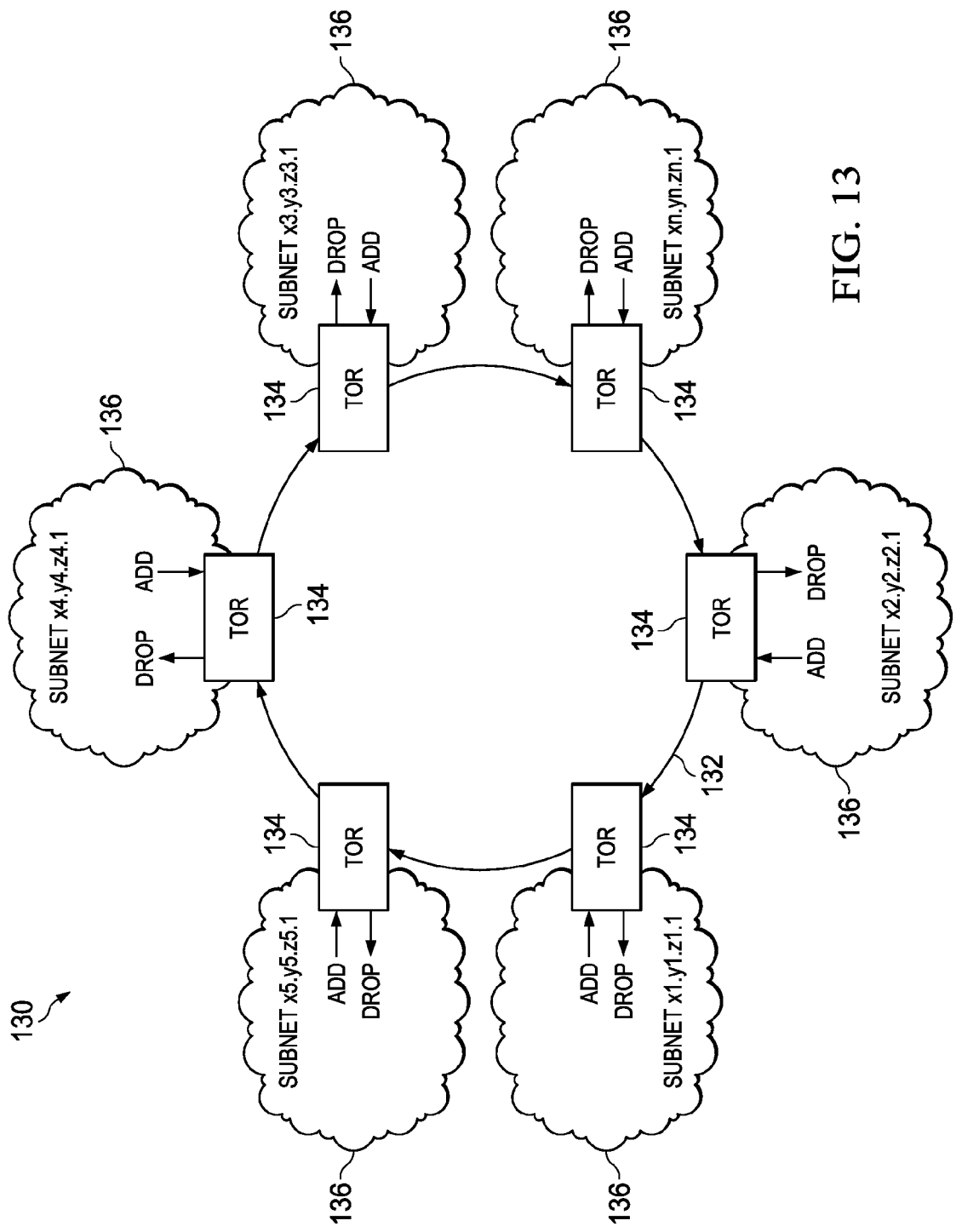
FIG. 13 illustrates another embodiment optical ring.

In one embodiment, a distributed switch uses a ring architecture. FIG. 13 illustrates system 130, an embodiment photonic switching system which uses optical space switching. System 130 contains TOR switches 134 configured in an optical ring with links 132 connecting the TOR switches in a ring configuration. The TOR switches are connected to subnetworks 136. System 130 is a bufferless photonic switch which uses a photonic wrapper. Separate wavebands are used for the control signal path and the payload data path. Photonic routing labels are used on the forward path between TORs (or switches) and the photonic switch. Signaling on the return path (between photonic switch and TORs) is used for contention control and synchronization.

In one example, a photonic ring operates asynchronously, for example with 100 GE or higher data rates. The wrapper size varies between a minimum and a maximum size. When a node has traffic to send and it detects an empty label or it is dropping a wrapped frame at this node, the node starts sending wrapper data with the frame's address. The transmission of the wrapper stops when it reaches either the maximum wrap size or a gap is detected.

In one example, a photonic ring operates synchronously using fixed time slots, where the wrap size is fixed. When a node does not have enough data to fill the wrapper, the slot is partially utilized.

In one example, the ring rate is at least ten times the add drop rate. For example, the ring rate is 1.28 Tbps or higher using OTDM. The add/drop rate may be 10 gigabit Ethernet (GE), 40 GE, or 100 GE. A synchronous wrapping scheme may be used, for example 16 packets are wrapped in a slot. The wrapped packets are concatenated, leaving a gap between frames. In an example time slot with 16 packets is 1.9 µs. The spacing of the TOR switches may be a few hundred meters, for example from 100 m to 800 m.

The TOR switches have optical addresses or labels. M packets with the same destination may be multiplexed in an OTDM signal. For example, 16 packets are multiplexed each at 40 G on each polarization for 640 G per polarization. Thus, there is a data rate of 1.28 Tbps for two polarizations. A wrapped frame is inserted into a slot when there is an empty label, and the label is replaced by the destination address.

Figure 14:
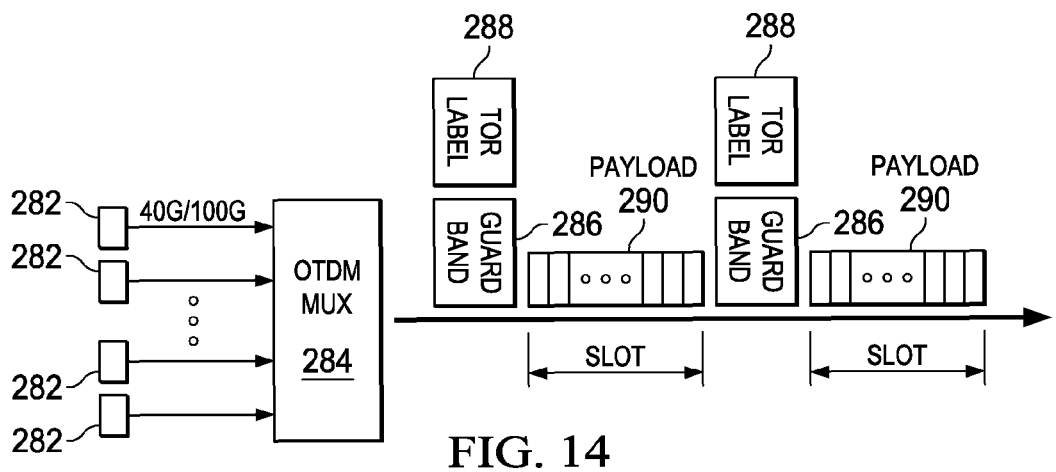
FIG. 14 illustrates optical frame generation.

FIG. 14 illustrates OTDM multiplexing. Links 282 receive streams of packets. For example, there are 16 links at 40 G or 100 G for two polarizations. The packets are received by OTDM multiplexer 284. Then the packets are wrapped into frames 290 with gap 286 between the frames. Label 288, an optical label, occurs during gap 286. The packets are concatenated into frames with a gap between frames, and the label is inserted into the gap. The gap time is used for signal processing switching, and routing. The payload may have a different frequency band than the signal.

To drop a frame, the TOR switches monitor the optical label passing through the ring on the signaling waveband. When the optical label matches its own optical label, the frame is removed from the ring to be received by the node.

Figure 15:
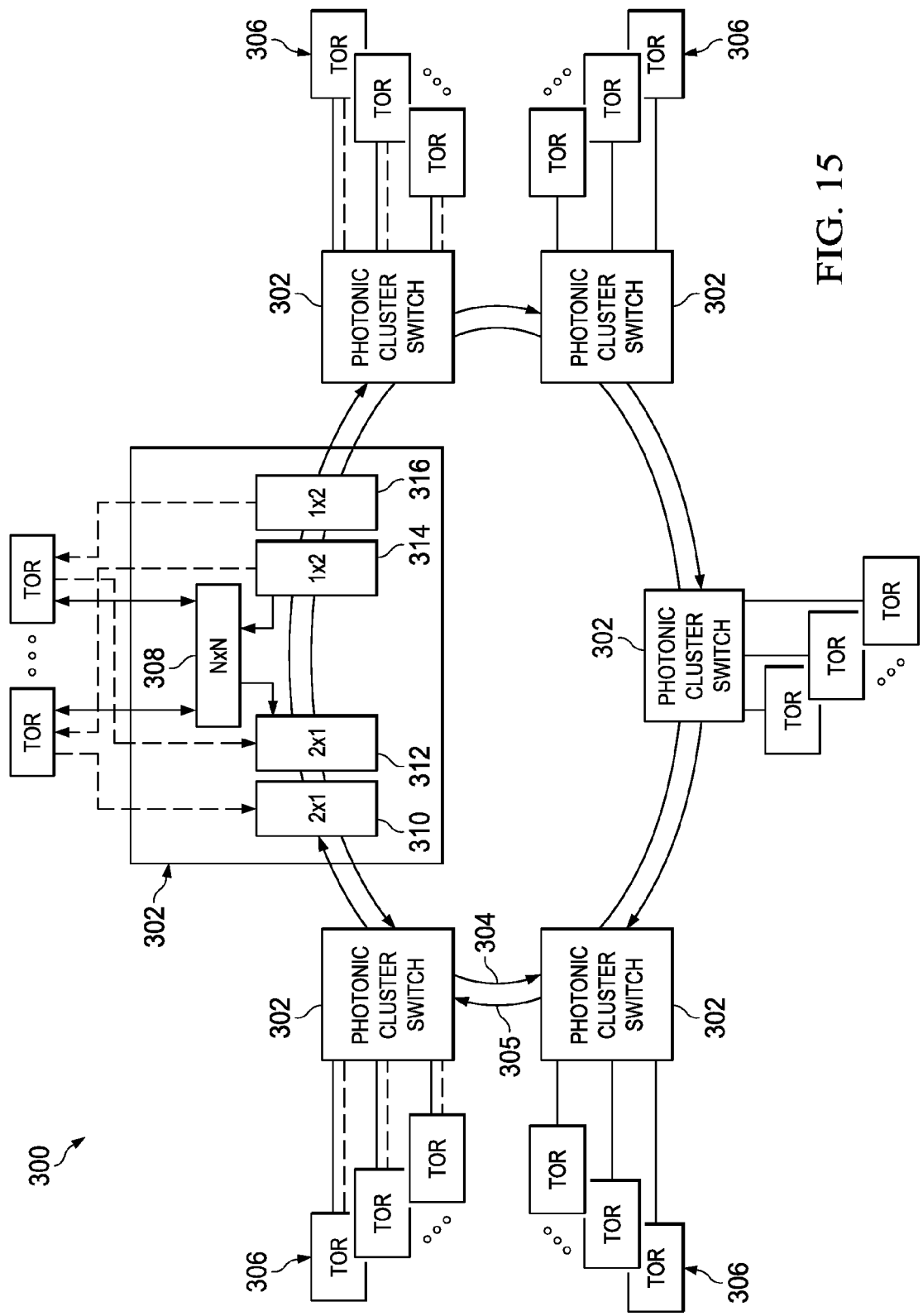
FIG. 15 illustrates an embodiment optical ring with centralized switching.

FIG. 15 illustrates photonic ring 300 for a hybrid photonic distributed ring with centralized photonic switches. Photonic ring 300 is a synchronous slotted system with wrapping. Photonic cluster switches 302 are configured in a ring with optical links 304 and 305, bidirectional optical links. A photonic cluster switch, photonic switch 308, is coupled to TOR switches 306. A photonic cluster switch contains one larger photonic switch and four smaller photonic switches. Photonic switch 308, a large N×N photonic switch, is used to switch between TOR switches in the same TOR groups, while photonic switches 314 and 316, 1×2 photonic switches are used to drop frames from optical links 304 and 305 respectively. Also, photonic switches 310 and 312 are used to add frames to optical links 304 and 305, respectively. Additionally, photonic switches 310, 312, 314, and 316 are used to communicate between TOR groups. In one example, many independent 1×2 and 2×1 photonic switches are integrated with a centralized N×N switching fabric.

In another embodiment, an N×N electrical cluster switch is used with an optical card to interface with an optical ring. The electrical cluster switch provides communications between TOR switches in a TOR group. Packets switched by the electrical cluster switch are added and dropped to an optical ring.

In an additional example, there are four optical links, and 4×4 photonic switches are used for adding or dropping frames to a ring. Alternatively, 2×2 photonic switches are used to add and drop frames with two optical links. Other small switches may be used.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A first optical node comprising:
   an input port configured to receive an input optical frame;
   a label detector coupled to the input port, wherein the label detector is configured to
      determine an address of the input optical frame, and
      determine whether the address of the input optical frame is a node address of the first optical node, a node address of a second optical node, or an empty address to produce a node label;
   a first optical switch coupled to the input port and to the label detector, wherein the first optical switch is configured to remove the input optical frame to produce a removed input optical frame when the node label indicates that the address of the input optical frame is the node address of the first optical node and to pass the input optical frame to a second optical switch when the node label indicates that the address of the input optical frame is the node address of the second optical node;
the second optical switch coupled to the first optical switch and to the label detector, wherein the second optical switch is configured to output the input optical frame to an output port when the node label indicates that the address of the input optical frame is the node address of the second optical node and to output an added optical frame to the output port when the added optical frame is available and the node label indicates that the address of the input optical frame is the empty address; and
a third optical switch coupled to the first optical switch and the second optical switch, wherein the third optical switch is configured to couple to a plurality of Ethernet switches, and wherein the third optical switch is configured to receive the removed input optical frame from the first optical switch, and to send the added optical frame to the second optical switch when the added optical frame is available.

2. The first optical node of claim 1, further comprising a splitter configured to direct a first portion of the input optical frame to the label detector and a second portion of the input optical frame to the first optical switch.

3. The first optical node of claim 1, further comprising an optical filter coupled to the input port, wherein the optical filter is configured to direct a label of the input optical frame in a first waveband to the label detector and a plurality of packets of the input optical frame in a second waveband to the first optical switch.

4. The first optical node of claim 1, wherein the second optical switch is further configured to output the added optical frame to the output port when the added optical frame is available and the node label indicates that the address of the input optical frame is the node address of the first optical node.

5. The first optical node of claim 4, further comprising a label encoder configured to select the address of the input optical frame when the node label indicates that the address of the input optical frame is the node address of the second optical node, to select an address of the added optical frame when the added optical frame is available and the node label indicates that the address of the input optical frame is either the node address of the first optical node or the empty address, and to select the empty address when the added optical frame is not available and the node label indicates that the address of the input optical frame is either the node address of the first optical node or the empty address, to produce a selected address, and to insert the selected address in a gap between the input optical frame, the added optical frame, or an empty optical frame, and another frame.

6. The first optical node of claim 5, further comprising a wrapper coupled to the second optical switch, wherein the wrapper is configured to wrap a plurality of packets to produce the added optical frame.

7. The first optical node of claim 1, further comprising an un-wrapper coupled to the first optical switch, wherein the un-wrapper is configured to un-wrap the input optical frame to produce a first packet and a second packet with an inter-packet gap between the first packet and the second packet.

8. The first optical node of claim 1, wherein the input optical frame comprises a plurality of concatenated packets and a label, wherein the label comprises the address of the input optical frame, and wherein the label is in a first waveband and a plurality of packets is in a second waveband.

9. The first optical node of claim 8, wherein the label is wavelength encoded.

10. A method of managing traffic in an optical ring, the method comprising:
receiving, by a first optical switch in a first node of the optical ring, an input optical frame and an address of the input optical frame;
determining, by the first node of the optical ring, whether the address of the input optical frame is a node address of the first node of the optical ring, a node address of a second node of the optical ring, or an empty address;
removing, by the first optical switch in the first node of the optical ring, the input optical frame from the optical ring upon determining that the address of the input optical frame is the node address of the first node of the optical ring;
receiving, by a third optical switch in the first node of the optical ring, the removed input optical frame from the first optical switch;
determining whether an added optical frame is available;
providing, by the third optical switch in the first node of the optical ring, the added optical frame to a second optical switch in the first node of the optical ring upon determining the added optical frame is available; and
transmitting, by the second optical switch in the first node of the optical ring, the added optical frame on the optical ring upon determining the added optical frame is available, and upon determining that the address of the input optical frame is either the node address of the first node or the empty address.

11. The method of claim 10, wherein transmitting the added optical frame on the optical ring comprises wrapping a plurality of packets to produce the added optical frame, wherein the added optical frame has a gap.

12. The method of claim 10, further comprising:
selecting an optical label to produce a selected optical label; and
transmitting the selected optical label on the optical ring in a gap of the input optical frame, a gap of the added optical frame, or a gap of an empty frame.

13. The method of claim 12, wherein selecting the optical label comprises:
selecting an empty label when the added optical frame is not available and the address of the input optical frame is either the empty address or the node address of the first node;
selecting the address of the input optical frame when the address of the input optical frame is the node address of the second node; and
selecting a node address of a third node when the added optical frame is available and the address of the input optical frame is either the empty address or the node address of the first node.

14. The method of claim 10, wherein removing the input optical frame comprises unwrapping the input optical frame to produce a plurality of packets.

15. The method of claim 10, further comprising continuing to propagate the input optical frame on the optical ring upon determining that the address of the input optical frame is the node address of the second node of the optical ring.

16. An optical system comprising:
a plurality of optical nodes; and
a first plurality of optical fibers connected the plurality of optical nodes in a first optical ring, wherein a first node of the plurality of optical nodes comprises
 a first optical switch configured to transmit a first plurality of optical frames on the first optical ring,
 a second optical switch configured to remove a second frame from the first optical ring, and
 a third optical switch, wherein the third optical switch is coupled to the first optical switch, the second optical switch, and a plurality of Ethernet switches.

17. The optical system of claim 16, wherein the plurality of optical nodes are coupled to a plurality of subnetworks.

18. The optical system of claim 16, further comprising a second plurality of optical fibers connecting the plurality of optical nodes in a second optical ring, wherein the first optical ring is configured to propagate a third plurality of optical frames clockwise and the second optical ring is configured to propagate a fourth plurality of optical frames counter-clock wise.

19. The optical system of claim 16, wherein the third optical switch is configured to receive the second frame.

* * * * *